(12) United States Patent
Tian et al.

(10) Patent No.: US 9,318,131 B2
(45) Date of Patent: Apr. 19, 2016

(54) WRITE GAP STRUCTURE FOR A MAGNETIC RECORDING HEAD

(71) Applicant: Seagate Technology LLC, Cupertino, CA (US)

(72) Inventors: Wei Tian, Eden Prairie, MN (US); Huaqing Yin, Eden Prairie, MN (US); Yan Dong, Eden Prairie, MN (US); Joseph M. Mundenar, Eden Prairie, MN (US); Jianhua Xue, Maple Grove, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/930,776

(22) Filed: Jun. 28, 2013

(65) Prior Publication Data

US 2015/0002963 A1  Jan. 1, 2015

(51) Int. Cl.
*G11B 5/31* (2006.01)
*G11B 5/23* (2006.01)

(52) U.S. Cl.
CPC ....... *G11B 5/23* (2013.01); *G11B 5/232* (2013.01); *G11B 5/3116* (2013.01)

(58) Field of Classification Search
CPC ..................................................... G11B 5/3116
USPC .......................... 360/119.01–119.04, 125.02, 360/125.09–125.11, 125.13–125.16, 360/125.19–125.21, 125.46–125.48, 360/125.51–125.53, 125.59–125.61, 360/125.64–125.66
See application file for complete search history.

(56) References Cited

U.S. PATENT DOCUMENTS

| 6,809,899 B1* | 10/2004 | Chen et al. | 360/125.13 |
| 8,233,233 B1* | 7/2012 | Shen et al. | 360/125.03 |
| 8,339,749 B2* | 12/2012 | Mochizuki | B82Y 10/00 360/123.12 |
| 2005/0219743 A1* | 10/2005 | Guan et al. | 360/125 |
| 2007/0064343 A1* | 3/2007 | Yazawa | G11B 5/1278 360/125.12 |
| 2009/0059426 A1* | 3/2009 | Sasaki et al. | 360/125.02 |
| 2009/0067098 A1* | 3/2009 | Kim | G11B 5/1278 360/313 |
| 2009/0116144 A1* | 5/2009 | Lee | G11B 5/1278 360/125.01 |
| 2009/0268344 A1* | 10/2009 | Guan | G11B 5/1278 360/119.02 |
| 2009/0284874 A1 | 11/2009 | Yin et al. | |
| 2011/0109999 A1 | 5/2011 | Benakli et al. | |
| 2011/0132869 A1* | 6/2011 | Hong | G11B 5/1278 216/22 |
| 2012/0044598 A1* | 2/2012 | Bai | G11B 5/1278 360/123.12 |
| 2012/0268843 A1* | 10/2012 | Linville et al. | 360/125.03 |
| 2012/0295132 A1* | 11/2012 | Min et al. | 428/812 |

(Continued)

OTHER PUBLICATIONS www.hgst.com, "Perpendicular Magnetic Recording Technology", HGST, Whitepaper, Nov. 2007.

(Continued)

*Primary Examiner* — Adam B Dravininkas
(74) *Attorney, Agent, or Firm* — Westman, Champlin & Koehler, P.A.

(57) ABSTRACT

The present application relates to a write gap structure for a magnetic recording head. In illustrated embodiments, the write gap structure includes multiple write gap segments along a beveled pole tip surface between a top edge and a bottom edge of the beveled pole tip surface to provide a narrow write gap proximate to the air bearing surface and a larger write gap behind the air bearing surface. In illustrated embodiments, the narrow write gap segment is formed between the beveled pole tip surface and a lower back surface of front shield and the larger write gap is formed between the beveled pole tip surface and an upper back surface of the front shield.

21 Claims, 9 Drawing Sheets

(56) References Cited

U.S. PATENT DOCUMENTS

2012/0295133 A1* 11/2012 Min et al. .................. 428/815.2
2012/0327535 A1    12/2012 Meloche et al.
2014/0169146 A1*  6/2014 Yin et al. .................. 369/13.33

OTHER PUBLICATIONS

Korean Office Action for Korean Patent Application No. 10-2014-0077434, dated May 26, 2015, 13 pages.

* cited by examiner

WRITE GAP STRUCTURE FOR A MAGNETIC RECORDING HEAD

BACKGROUND

Data storage devices use magnetic recording heads to read and/or write data on a magnetic storage media, such as a rotating disc. Magnetic recording heads typically include inductive write elements to record data on the storage media. Inductive write elements include a main pole and pole tip and one or more return poles. Current is supplied to write coils to induce a flux path in the main pole to record data on one or more magnetic storage layers of the media. Data can be recorded using parallel and perpendicular recording techniques. Demand for increased storage has created demand for higher field gradients to record more data in smaller spaces. Embodiments of the present invention provide solutions to these and other problems, and offer other advantages over the prior art.

SUMMARY

The present application relates to a write gap structure for a magnetic recording head. As disclosed, the write gap structure has a narrow write gap width, for example, less than 25 nanometers (nm), between the write pole and a front shield proximate to an air bearing surface to enhance field gradient for higher density recording. In particular, in illustrated embodiments disclosed, the narrow write gap width provided at the air bearing surface is 20 nm or less In embodiments disclosed, the write gap structure includes multiple write gap segments along a beveled pole tip surface between a top edge and bottom edge of the beveled pole tip surface. The multiple write gap segments include a proximal write gap segment located proximate to the air bearing surface and a distal gap segment recessed from the air bearing surface behind the proximal gap segment. In illustrated embodiments, the proximal write gap segment extends between the beveled pole tip surface and a lower front surface of the front shield to provide the narrow gap width proximate to the air bearing surface. The distal gap segment, has a larger gap width than the narrower gap width and extends between the beveled surface and an upper front surface of the front shield.

In illustrated embodiments, the upper front surface of the front shield is spaced forward from the lower front surface in a direction away from the beveled pole tip surface to provide the larger write gap width of the distal write gap segment. The upper front surface is connected to the lower front surface via a step. In another embodiment, the upper front surface has a different incline angle than the lower front surface to provide the larger write gap width of the distal write gap segment. For example, in one illustrated embodiment, the lower front surface is inclined at an angle conformal to the slope angle of the beveled pole tip surface and the upper front surface is inclined at a non-conformal angle with respect to the beveled pole tip surface of the pole tip to provide the larger write gap width.

The application discloses process steps including deposition of multiple layers and selective etching to form the multiple write gap segments and upper and lower front surfaces of the front shield as described. Other features and benefits that characterize embodiments of the present invention will be apparent upon reading the following detailed description and review of the associated drawings.

DETAILED DESCRIPTION OF ILLUSTRATIVE EMBODIMENTS

Figure 1:
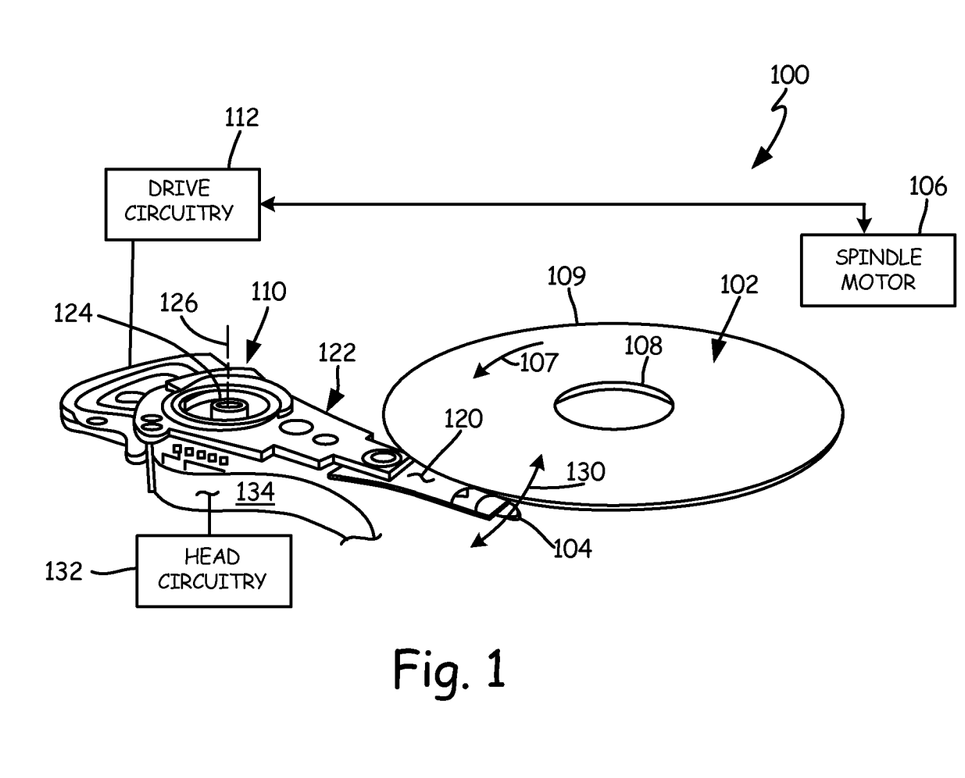
FIG. 1 illustrates an embodiment of a data storage device in which embodiments of the present application can be used.

The present application relates to a write assembly for a magnetic recording head for data storage devices 100 of the type illustrated in FIG. 1. As shown in FIG. 1, the data storage device 100 includes a magnetic data storage media or disc 102 and head 104. The head 104 including one or more transducer elements (not shown in FIG. 1) is positioned above the data storage media 102 to read data from and/or write data to the data storage media 102. In the embodiment shown, the data storage media 102 is a rotating disc or other magnetic storage media that includes a magnetic storage layer or layers. For read and write operations, a spindle motor 106 (illustrated schematically) rotates the media 102 as illustrated by arrow 107 and an actuator mechanism 110 positions the head 104 relative to data tracks on the rotating media 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The one or more transducer elements of the head 104 are coupled to head circuitry 132 through flex circuit 134 to encode and/or decode data. Although FIG. 1 illustrates a single load beam coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 2:
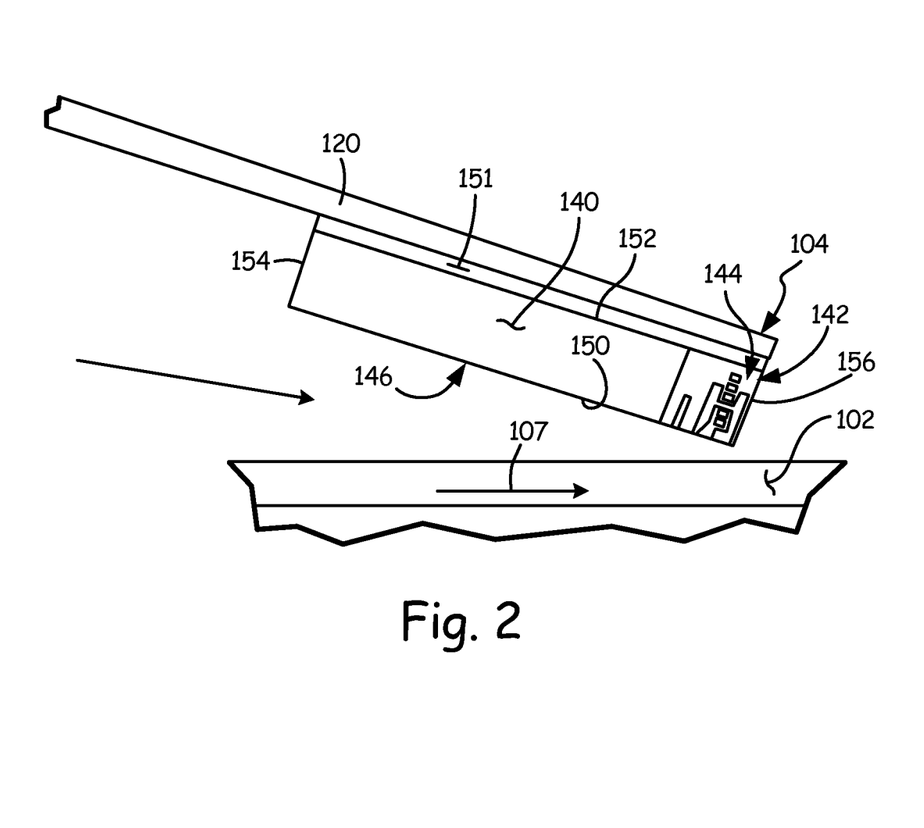
FIG. 2 is a schematic illustration of a head including one or more transducer elements above a magnetic recording media.

FIG. 2 is a detailed illustration of the head 104 above the media 102. The one or more transducer elements on the head 104 are fabricated on a slider 140 to form a transducer portion 142 of the head 104. The transducer portion 142 shown includes write elements encapsulated in an $Al_2O_3$ alumina structure to form a write assembly 144 of the head. As shown, the head 104 includes an air bearing surface 146 along a bottom surface 150 of the head or slider facing the media 102. The head 104 is coupled to the load beam 120 through a gimbal spring 151 coupled to a top surface 152 of the head or slider 140 facing away from the media 102. The media 102 can be a bit patterned media or other magnetic storage media including one or more magnetic recording layers.

During operation, rotation of the media or disc 104 creates an air flow in direction 107 as shown in FIG. 1 along the air bearing surface 146 of the slider 140 from a leading edge 154 to the trailing edge 156 of the slider 140 or head. Air flow along the air bearing surface 146 creates a pressure profile to support the head 104 and slider 140 above the media 102 for read and/or write operations. As shown, the transducer portion 142 is formed along the trailing edge 156 of the slider 140

Figure 3A:
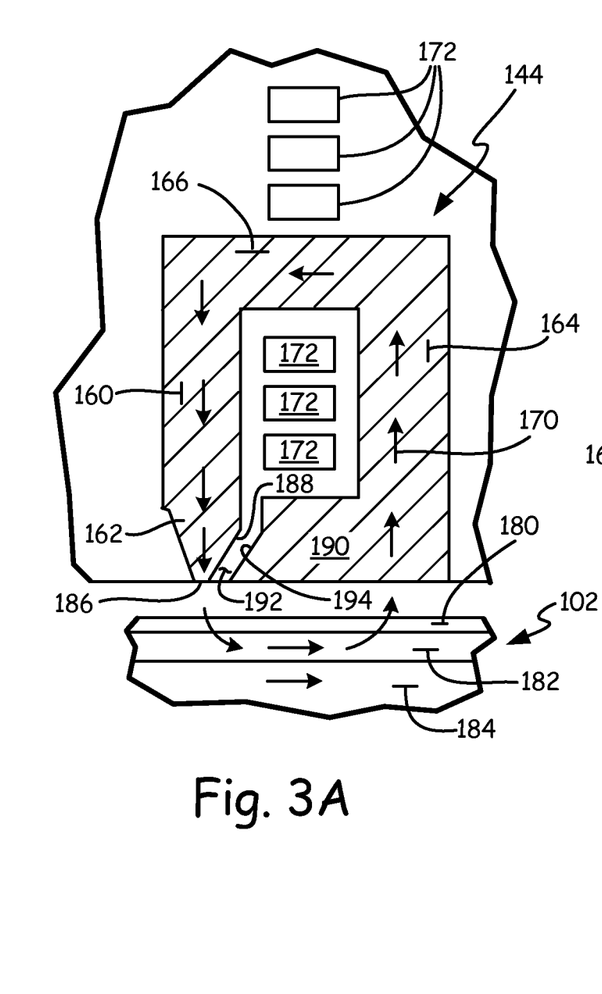
FIGS. 3A-3C illustrate a write assembly including a write gap between a beveled pole tip surface and front shield of the write assembly.

FIG. 3A is a detailed cross-sectional view of an embodiment of the write assembly 144 for the magnetic recording head 104. As shown, the assembly 144 includes a main pole 160 having a pole tip 162 and a return pole 164 connected to the main pole 160 through top vias 166. A magnetic flux path as illustrated by arrows 170 is induced in the pole tip 162 through the main pole 160 by supplying current to coils 172. The direction of the flux path is controlled via the direction of the current supplied to the coils 172. Coils 172 are embedded in a non-magnetic layer or insulating portion 174 between the main pole 160 and return pole 164. The induced magnetic path provides a magnetic field proximate to the media 104 to induce a magnetic field or polarity in one or more magnetic recording layers 180 of the magnetic storage media 102. In the illustrated embodiment, the media includes one or more soft magnetic underlayers (SUL) 182 to form a closed flux path between the main pole 160 and the return pole 164 to implement a perpendicular recording pattern where the data bits are recorded in an up/down orientation on the media. The magnetic recording layer(s) 180 and SUL(s) 182 are formed on a substrate 184. One or more protective or coating layers (not shown) can be deposited over the recording layer(s) 180 or other layers as is known in the art.

Figure 3B:
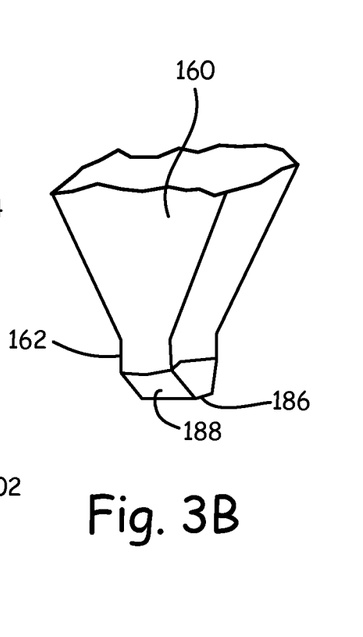
Figure 3C:
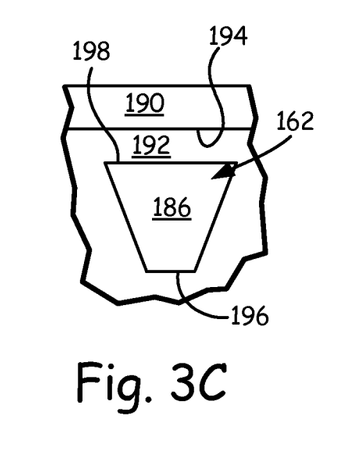

FIGS. 3B-3C are detailed illustrations of the main pole 160 and pole tip 162. As shown in FIG. 3B, a width of the pole 160 narrows in the cross track direction toward the pole tip 162. The pole tip includes air bearing surface 186 facing the media and a beveled front surface 188 which intersect front surface 189 at an angle to provide a tapered pole tip dimension along recording tracks of the media 102. As shown in FIGS. 3A and 3C, the write assembly 144 also includes a front shield 190 formed of a magnetic material forward from the main pole 160 and magnetically coupled to the return pole 164. The front shield 190 is spaced from the pole tip 162 to form a write gap 192 as shown in FIGS. 3A and 3C. As shown, the write gap 192 extends between the beveled surface 188 of the pole tip and a front surface 194 of the front shield 190 spaced from the pole tip 162.

As illustrated in FIG. 3C, the air bearing surface (ABS) 186 of the pole tip 162 extends from a leading edge 196 of the pole tip to a trailing edge 198 of the pole tip. The leading edge 196 of the ABS 186 has a narrower width in a cross track direction than the width of the trailing edge 198 of the ABS 186 of the pole tip. The narrow width at the leading edge 196 forms a generally trapezoidal air bearing pole tip surface 186. The trapezoidal shape reduces adjacent track interference due to skew angle of the pole tip relative to tracks on the media 102. As shown, the front shield 190 is spaced from the trailing edge 198 of the ABS 186 to form the write gap 192 as shown in FIG. 3A. The write gap 192 is formed of a magnetically insulating material separating the pole tip 162 from the front shield 190. Smaller write gaps 192 between the pole tip 162 and the front shield 190 tend to yield higher field gradients for a given field strength to provide higher data storage density. However, efforts to reduce a width of the write gap 192 to increase field gradient can degrade performance due to loss of write field.

Figure 4A:
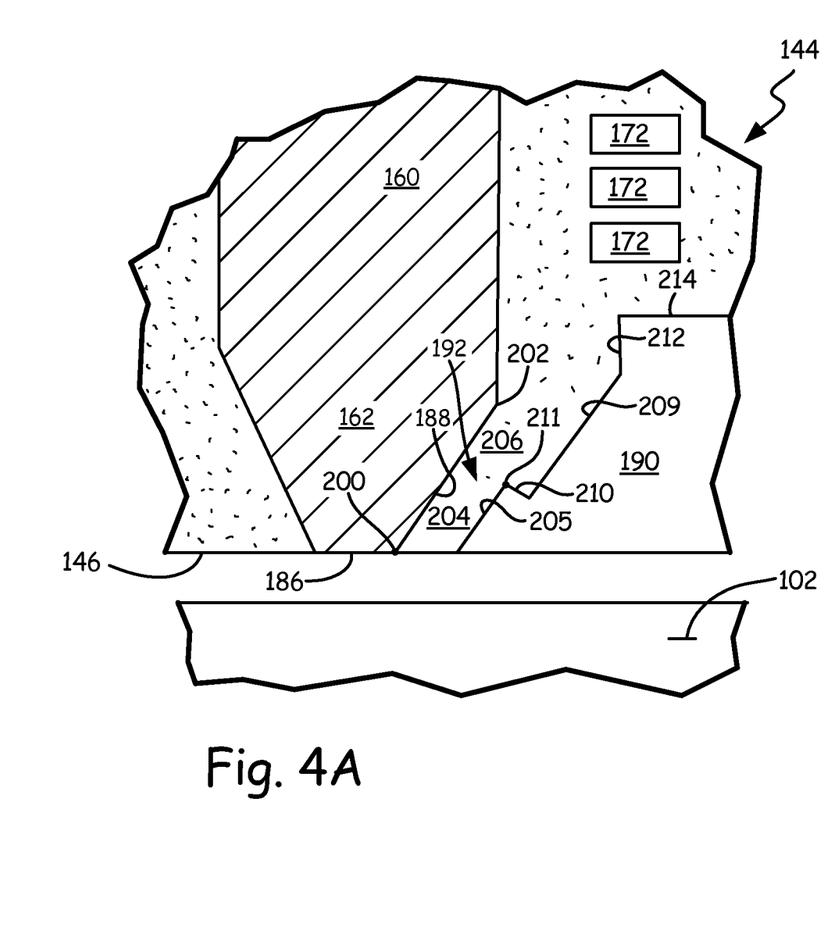
FIGS. 4A-4C illustrate embodiments of a write assembly having multiple write gap segments between top and bottom edges of a front beveled surface of a write pole tip.
Figure 4B:
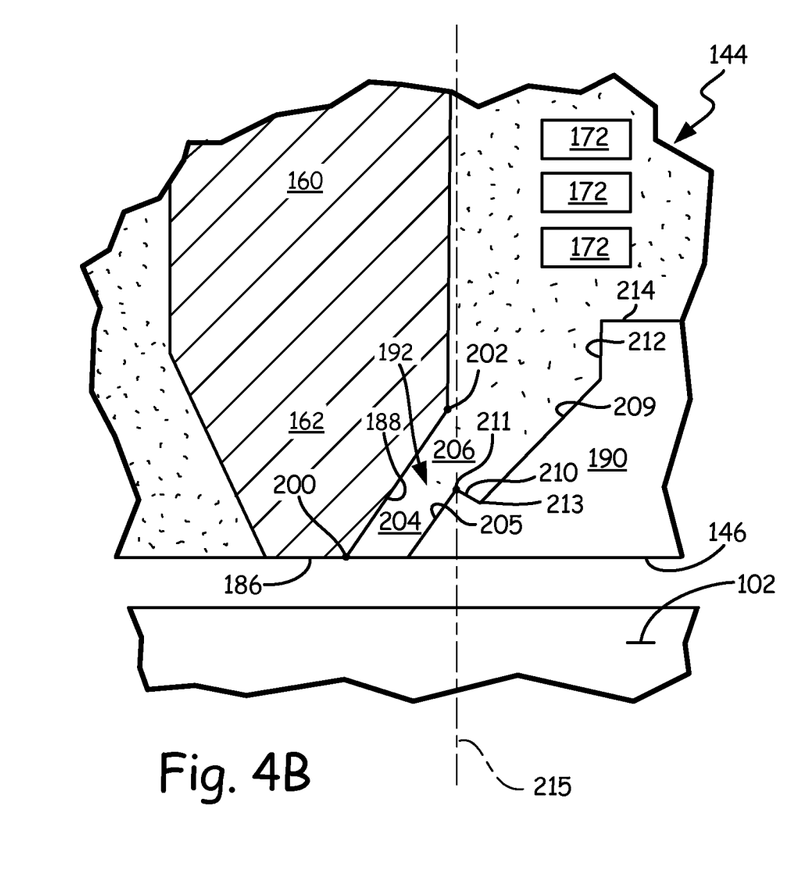
Figure 4C:
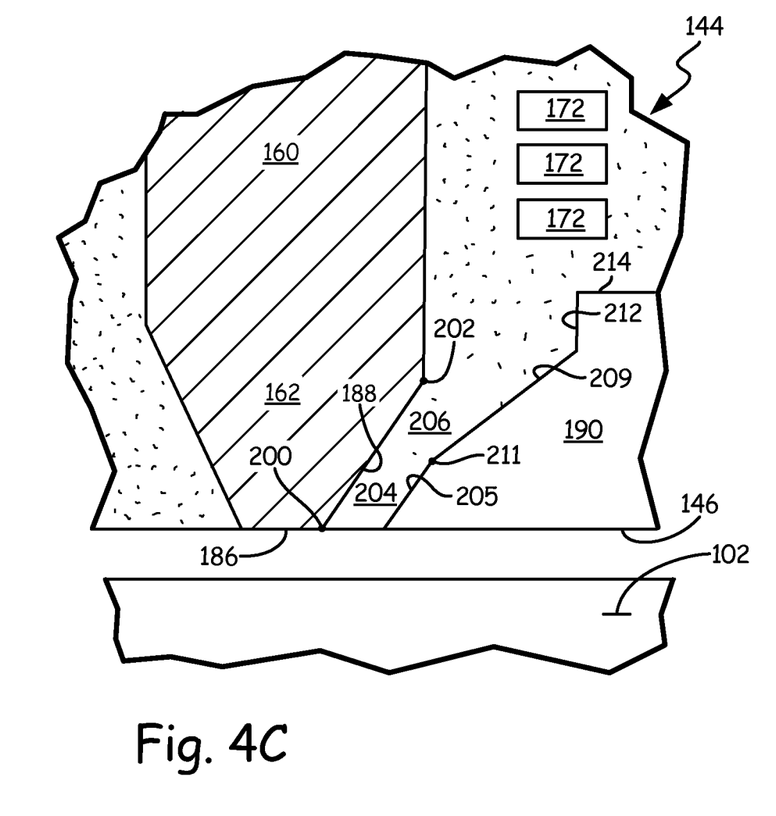

FIGS. 4A-4C disclose a write gap structure providing multiple write gap segments along the beveled surface 188 of the pole tip 162. In illustrated embodiments, the multiple write gap segments provide a smaller write gap or write gap width proximate to the air bearing surface 186 to enhance field gradient and provide a larger write gap or write gap width behind the air bearing surface 186 to limit flux leakage. In the embodiment shown in FIG. 4A, the multiple gap segments are formed between a bottom bevel edge 200 and top bevel edge 202 of the beveled pole tip surface 188. The multiple write gap segments include a proximal write gap segment 204 formed between the beveled pole tip surface 188 and a lower front surface 205 of the front shield 190 and a distal write gap segment 206 formed between the beveled pole tip surface 188 and an upper front surface 209 of the front shield 190. In the embodiment shown, the lower front surface 205 and the upper front surface 209 are connected through step surface 210. Step surface 210 extends from front edge 211 to a lower edge 213 of the upper front surface 209. A plane 215 is perpendicular to the hearing surface 146.

The lower front surface 205 intersects to step surface 210 at a front edge 211 and the upper front surface 209 intersects the step surface 210 forward from the front edge 211 in a direction away from the beveled pole tip surface 188 to provide the larger gap width between the beveled pole tip surface 188 and the upper front surface 209. As shown, the lower front surface 205 is sloped to provide a fixed or conformal gap width between the beveled pole tip surface 188 and the lower front surface 205. In the illustrated embodiment, the upper front surface 209 is also conformal with the angle of the beveled surface 188 but is spaced forward from the lower front surface 205 to provide the larger write gap width of the distal write gap segment 206 as described.

The narrow conformal gap width along the proximal write gap segment 204 provides a narrow write gap at the ABS to enhance write field gradient for high density recording, while the larger write gap width along the distal write gap segment 206 increases the spacing between the beveled pole tip 188 and shield 190 to reduce flux leakage to limit reductions in write field strength. As shown, step 210 is located between the bottom edge 200 and top edge 202 of the beveled pole tip surface 188 to define a transition between the proximal and distal write gap segments 204, 206. In the illustrated embodiment, step 210 is located closer to the top bevel edge 202 so that the wider distal gap segment 206 is sufficiently spaced from the air bearing surface to maintain high write field gradient, while limiting flux leakage to the shield proximate to the top edge 202 of the beveled pole tip surface 188. In the illustrated embodiment shown, a vertical front surface 212 connects the upper front surface 209 to a top surface 214 of the shield 190 spaced from a bottom or air bearing surface of the shield 190. It should be understood that application of the multiple write gap segments is not limited to the front surface including the vertical surface portion 212, or particular structure shown.

In another embodiment illustrated in FIG. 4B, the write gap 192 includes proximal write gap segment 204 proximate to the air bearing surface and a distal gap segment 206 spaced from the air bearing surface as previously described. As shown, the front surface of the shield 190 includes the lower front surface 205 and upper front surface 209 between the bottom and top edges 200, 202 of the front beveled pole tip surface 188. Similar to the embodiment illustrated in FIG. 4A, the proximal write gap segment 204 is formed between the beveled pole tip surface and the lower front surface 205 of the front shield 190 and the distal write gap segment 206 is formed between the beveled pole tip surface 188 and upper front surface 209 of the front shield 190.

As shown, front surface step 210 connects the lower front surface 205 to the front back surface 209 to provide a narrow gap along the proximal write gap segment 204 smaller than the write gap width along the distal write gap segment 206 as previously described. As shown, the lower front surface 205 is sloped to provide a fixed or conformal gap width between the beveled pole tip surface 188 and the lower front surface 205 of the front shield 190. The upper front surface 209 is spaced from the lower front surface 205 via step 210 and is sloped away from the beveled surface 188 at a non-conformal angle to provide the larger gap width along the distal write gap segment 206. In the illustrated embodiment shown, vertical front surface 212 connects the upper front surface 209 and top surface 214 of the shield 190. Thus, as described, upper and lower front surfaces 205, 209 are inclined at different angles to form the narrow conformal write gap at the air bearing surface and the enlarged write gap behind the air bearing surface.

FIG. 4C illustrates another embodiment of a write assembly 144 including multiple proximal and distal gap segments 204, 206 as previously illustrated in FIGS. 4A-4B. In the embodiment illustrated in FIG. 4C, the upper and lower front surfaces 205, 209 of the front shield 190 are directly connected at back edge 211. The upper and lower front surfaces 205, 209 are inclined at different slope angles to form the proximal write gap width and distal write gap width having a larger dimension than the proximal write gap width. The front edge 211 connecting the upper and lower front surfaces 205, 209 is located above the bottom bevel edge 200 and below the top beveled edge 202 of the pole tip 162. As shown, the lower front surface 205 extends at a conformal angle relative to the beveled front pole tip surface 188 to provide a conformal write gap proximate to the air bearing surface 186 between the beveled pole tip surface 188 and the lower front surface 205 of the front shield 190. The upper front surface 209 extends at a non-conformal angle to provide the distal write gap width that increases in a direction away from the air bearing surface above the front edge 211 to provide the larger write gap behind the air bearing surface proximate to the top edge of the beveled pole tip surface 188.

Figure 5A:
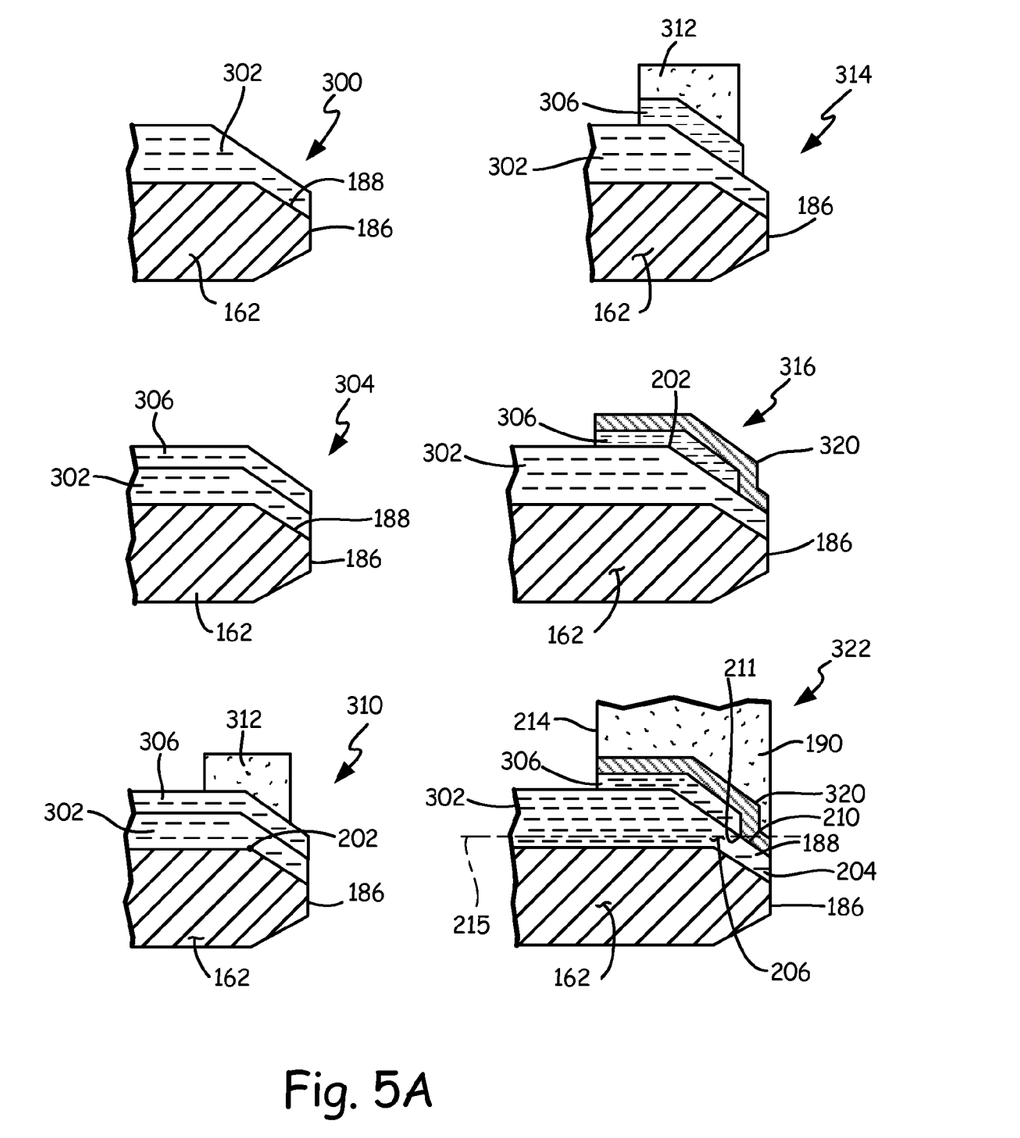
FIGS. 5A-5C illustrate embodiments of process steps for fabricating a write assembly including multiple write gap segments.

FIG. 5A illustrates process steps for fabricating embodiments of the write gap as disclosed in FIG. 4A. As shown in step 300, an insulating structure is formed on the front surface and beveled surface 188 of the write pole 162. The insulating structure is formed by depositing a first non-magnetic layer 302. In the embodiment shown, the non-magnetic layer 302 is etched along the beveled surface 188 to form a conformal width along the beveled pole tip surface 188. In step 304, a second non-magnetic layer 306 is deposited on the first non-magnetic layer 302. The first and second non-magnetic layers 302, 306 can be the same material or different materials. Illustrative first and second non-magnetic materials for layers 302, 306 include Al$_2$O$_3$ alumina, Ru, NiCr, NiRu, Cr, SiO$_2$ or amorphous carbon A-C. The first and second non-magnetic layers 302, 306 can be deposited using sputtering, chemical vapor deposition (CVD), molecular beam epitaxy (MBE), atomic layer deposition (ALD) e-beam evaporation, ion-beam sputtering and other deposition methods as known in the art. In one illustrated embodiment, the first non-magnetic layer 302 is Al$_2$O$_3$ and the second non-magnetic layer 306 is amorphous carbon a-C.

In step 310, a mask 312 is applied to a top portion of the second non-magnetic layer 306 proximate to the top beveled edge 202. The second non-magnetic layer 306 is etched or milled in the non-masked areas to remove the second non-magnetic layer 306 from the first non-magnetic layer 302 in the non-masked areas as shown in step 314. As shown in step 316, a seed layer 320 is applied to the second non-magnetic layer 306 and the first non-magnetic layer 302 of the etched or milled portion to plate the front shield 190. As shown in step 322, the front shield is plated on the seed layer 320 to form the lower and upper front surfaces 205, 209 and top surface 214 of the front shield 190. As shown, the top surface 214 of the shield aligns with a top of the second non-magnetic layer 306. Thus, as shown, the first non-magnetic layer forms the gap width of the proximal gap segment 204 and the first and second non-magnetic layers 302, 306 form the gap width of the distal write gap segment 206.

Figure 5B:
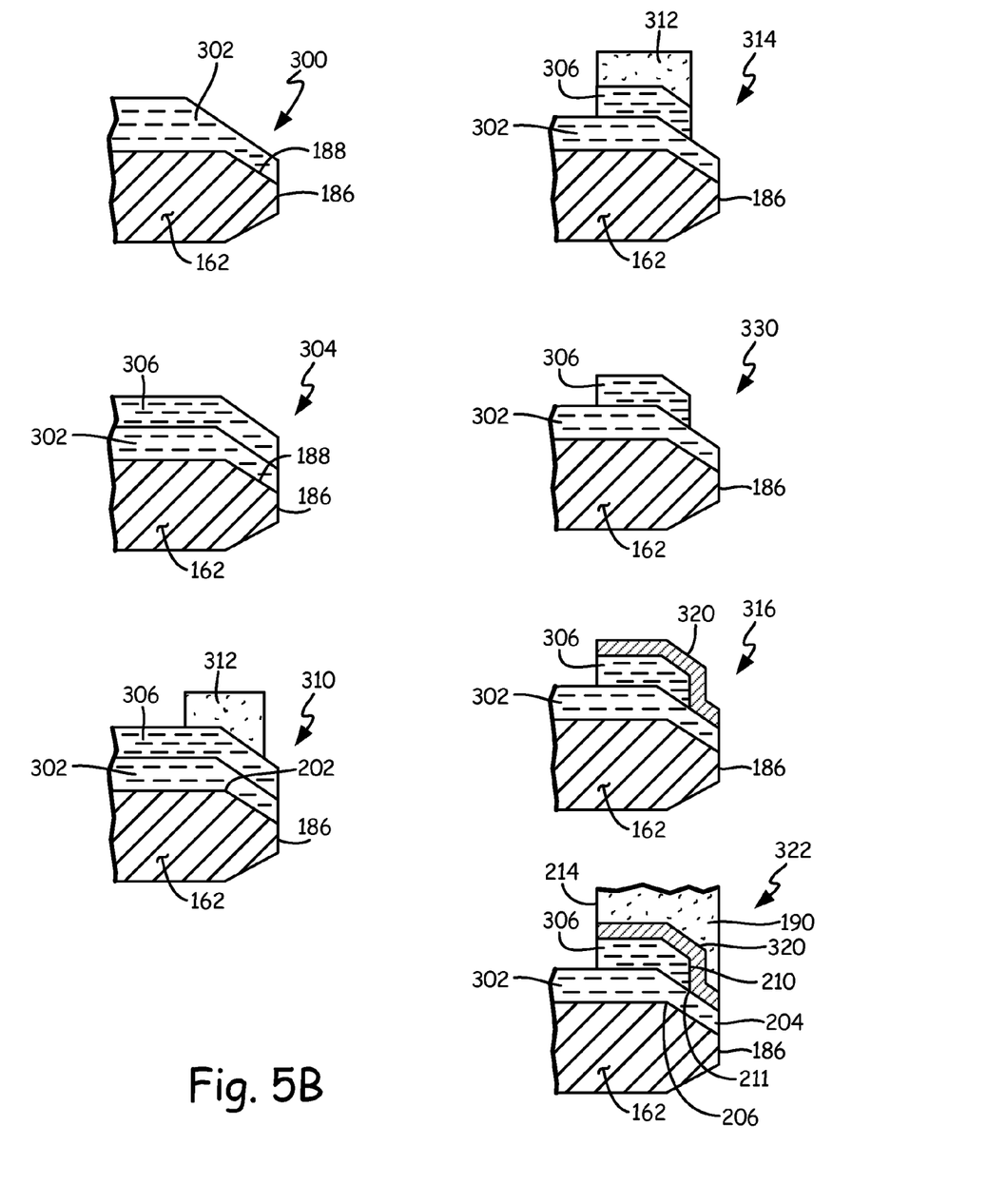

FIG. 5B illustrates process steps for fabricating another embodiment of the write gap structure illustrated in FIG. 4B where like numbers are used to identify like steps in the previous embodiment. As shown in FIG. 5B, in step 300 the first non-magnetic layer 302 is formed on the front and beveled surfaces of the write pole and in step 304, a second non-magnetic layer 306 is deposited on the first non-magnetic layer 302. In step 310, the mask 312 is applied to a portion of the second non-magnetic layer 306 and the second non-magnetic layer 306 is etched or milled in the non-masked areas to remove the second non-magnetic layer 306 from the first non-magnetic layer 302 as show in step 314. Thereafter a portion of the second non-magnetic layer 306 is etched or milled to form an inclined angle that is different from the incline angle of the beveled surface to provide the increasing gap width along the distal write gap segment 206 behind the air bearing surface 186. As shown in steps 314, 316, the front shield 190 is fabricated or plated on a seed layer 320 to form the lower and upper front surfaces 205, 209 and conformal and non-conformal proximal and distal write gap segments 204, 206 as previously described and shown in FIG. 4B.

Figure 5C:
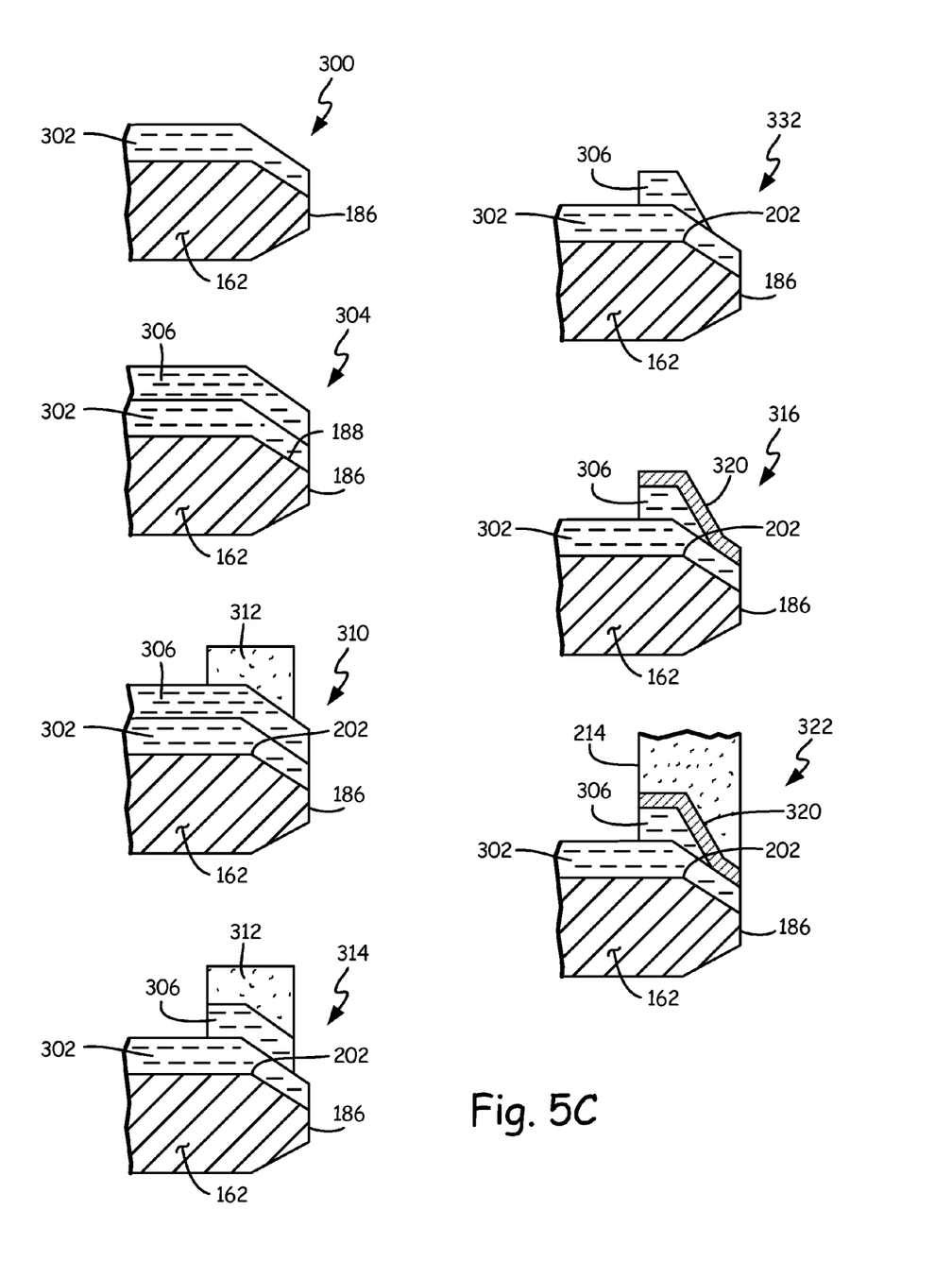

FIG. 5C illustrates process steps for fabricating another embodiment of the write gap structure as illustrated in FIG. 4C where like numbers are used to identify like steps in previous FIGS. 5A-5B. The insulating structure is formed by depositing a first non-magnetic layer 302 and second non-magnetic layer 306 as shown in steps 300, 304. In steps 310, 314 a bottom portion of the second non-magnetic layer 306 is removed to form the proximal gap segment 204 as previously described. In step 332, the second non-magnetic layer 306 is etched or milled to form the sloped surface having a different inclined slope angle or non-conformal slope angle with respect to the beveled surface 188 to provide the larger write gap of the distal write gap segment 206. Thereafter in steps 316, 322, the front shield 190 is plated on seed layer 320 and the first and second non-magnetic layers 302, 306 to form the upper and lower front surfaces 205, 209 of the front shield as previously described.

Although FIGS. 5A-5C illustrate process steps for fabricating the multiple segment write gaps described in the present application, application is not limited to the particular process steps or order described. It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application, while maintaining substantially the same functionality without departing from the scope and spirit of the present invention. In addition, although embodiments described herein are directed to a write gap structure for a specific write assembly including a single return pole, application is not limited to the specific embodiments or write assembly shown.

What is claimed is:
1. A write assembly comprising:
a write pole having a pole tip including a beveled pole tip surface having a bottom edge formed at an air bearing surface and a top edge spaced from the bottom edge;

a front shield spaced from the pole tip including an upper front surface and a lower front surface connected through a front edge located below the top edge of the beveled pole tip surface, and a vertical front surface extending upward from a top of the upper front surface and substantially parallel to the write pole above the top edge of the beveled pole tip surface; and a non-magnetic write gap including a proximal write gap segment located proximate to the air bearing surface having a proximal gap width extending between the beveled pole tip surface and the lower front surface of the shield and a distal write gap segment having a distal gap width larger than the proximal gap width extending between the beveled pole tip surface and the upper front surface of the shield, the proximal and distal write gaps measured in a direction normal to the beveled pole tip surface, wherein the upper front surface and the lower front surface are connected through a front step, and wherein the front step is downwardly sloped towards the air bearing surface at an angle other than 90 degrees to both the air bearing surface and to a plane perpendicular to the air bearing surface.

2. The write assembly of claim 1 wherein the air bearing surface of the pole tip includes a leading edge and a trailing edge formed at the bottom edge of the beveled pole tip surface and the leading edge has a narrower cross-track width dimension than a cross-track width dimension of the trailing edge at the bottom edge of the beveled pole tip surface.

3. The write assembly of claim 1 in combination with a media having a soft under layer and a return pole to form a flux path between the write pole and the return pole through the soft under layer.

4. The write assembly of claim 1 wherein the lower front surface is conformal to the beveled pole tip surface to form a conformal gap along the proximal write gap segment.

5. The write assembly of claim 4 wherein the upper front surface is non-conformal to the beveled pole tip surface to form a non-conformal gap along the distal write gap segment between the front edge and the upper front surface, and a conformal gap along the distal write gap between the write pole above the top edge and the vertical front surface.

6. The write assembly of claim 1 wherein the lower front surface is conformal with the beveled pole tip surface.

7. The write assembly of claim 6 wherein the upper front surface is non-conformal with the beveled pole tip surface.

8. The write assembly of claim 6 wherein the upper front surface is conformal with the beveled pole tip surface.

9. The write assembly of claim 1 wherein the upper and lower front surfaces of the front shield have different slope angles to define the proximal and distal gap widths.

10. The write assembly of claim 1 wherein the proximal gap width is less than 25 nm and the distal gap width is 25 nm or greater.

11. The write assembly of claim 1 wherein the proximal gap width is 20 nm or less and the distal gap width is more than 20 nm.

12. The write assembly of claim 1 and wherein the front step extends from the front edge to a lower edge of the upper front surface that is located below the front edge.

13. A write assembly comprising
a write pole having a beveled pole tip surface;
a front shield spaced from the beveled pole tip surface; and
a non-magnetic write gap between the beveled pole tip surface and a lower front surface of the front shield having a conformal write gap width less than 25 nm, between the beveled pole tip surface and an upper front surface of the front shield having a non-conformal write gap width greater than 25 nm, and between a substantially vertical pole tip surface and a vertical front surface of the front shield having a conformal write gap width of greater than 25 nm, the non-magnetic write gap measured in a direction normal to the beveled pole tip surface, wherein the front shield includes a surface step connecting the upper and lower front surfaces, and wherein the surface step is downwardly sloped towards a bearing surface at an angle other than 90 degrees to both the bearing surface and to a plane perpendicular to the bearing surface.

14. The write assembly of claim 13 wherein the conformal write gap width between the beveled pole tip surface and the lower front surface of the front shield is 20 nm or less.

15. The write assembly of claim 13 wherein the upper front surface and the lower front surface have different slope angles.

16. A write assembly comprising:
a write pole having a pole tip including a beveled pole tip surface having a bottom edge formed at a bearing surface and a top edge spaced from the bottom edge;
a front shield spaced from the pole tip including an upper front surface and a lower front surface connected through a front edge located below the top edge of the beveled pole tip surface, and a vertical front surface extending upward from a top of the upper front surface and substantially parallel to the write pole above the top edge of the beveled pole tip surface; and
a non-magnetic write gap including a proximal write gap segment located proximate to the bearing surface having a proximal gap width extending between the beveled pole tip surface and the lower front surface of the shield and a distal write gap segment having a distal gap width larger than the proximal gap width extending between the beveled pole tip surface and the upper front surface of the shield, the proximal and distal write gaps measured in a direction normal to the beveled pole tip surface, wherein the proximal write gap segment comprises a bi-layered structure with each layer of the bi-layered structure comprising a segment with opposing surfaces that are sloped at an angle other than 90 degrees to both the bearing surface and to a plane perpendicular to the bearing surface, and wherein the distal write gap segment comprises a tri-layered structure.

17. The write assembly of claim 16 and wherein each layer of the tri-layered structure comprises a segment with opposing surfaces that are sloped relative to the bearing surface at an angle other than 90 degrees.

18. The write assembly of claim 17 and wherein the sloped opposing surfaces in the segment in each layer of the tri-layered structure are substantially parallel opposing surfaces.

19. The write assembly of claim 16 and wherein the sloped opposing surfaces in the segment in each layer of the bi-layered structure are substantially parallel opposing surfaces.

20. The write assembly of claim 16 and wherein at least one layer of the bi-layered structure is a seed layer.

21. A write assembly comprising:
a write pole having a pole tip including a beveled pole tip surface having a bottom edge formed at a bearing surface and a top edge spaced from the bottom edge;
a front shield spaced from the pole tip including an upper front surface and a lower front surface connected through a front edge located below the top edge of the beveled pole tip surface, and a vertical front surface extending upward from a top of the upper front surface and substantially parallel to the write pole above the top edge of the beveled pole tip surface; and a non-magnetic write gap including a proximal write gap segment located proximate to the bearing surface having a proximal gap width extending between the beveled pole tip surface and the lower front surface of the shield and a distal write gap segment having a distal gap width larger than the proximal gap width extending between the beveled pole tip surface and the upper front surface of the shield, the proximal and distal write gaps measured in a direction normal to the beveled pole tip surface, wherein the upper front surface and the lower front surface are connected through a surface step, and wherein the surface step is neither parallel nor perpendicular to the bearing surface.

* * * * *